US010595204B2

(12) United States Patent
Greer

(10) Patent No.: US 10,595,204 B2
(45) Date of Patent: Mar. 17, 2020

(54) FLEXIBLE REMOTE SERVER VALIDATION

(71) Applicant: salesforce.com, inc., San Francisco, CA (US)

(72) Inventor: Steven Alan Greer, Plainfield, IN (US)

(73) Assignee: salesforce.com, inc., San Francisco, CA (US)

( * ) Notice: Subject to any disclaimer, the term of this patent is extended or adjusted under 35 U.S.C. 154(b) by 189 days.

(21) Appl. No.: 15/668,520

(22) Filed: Aug. 3, 2017

(65) Prior Publication Data

US 2019/0045360 A1 Feb. 7, 2019

(51) Int. Cl.
  *G06F 11/22* (2006.01)
  *H04W 12/08* (2009.01)
  *H04L 29/06* (2006.01)

(52) U.S. Cl.
  CPC ......... *H04W 12/08* (2013.01); *G06F 11/2289* (2013.01); *G06F 11/2294* (2013.01); *H04L 63/08* (2013.01)

(58) Field of Classification Search
  None
  See application file for complete search history.

(56) References Cited

U.S. PATENT DOCUMENTS

| | | | | |
|---|---|---|---|---|
| 9,021,438 | B2 * | 4/2015 | Dayan | G06F 11/3688 717/124 |
| 10,296,443 | B2 * | 5/2019 | Grechanik | G06F 11/366 |
| 2013/0152047 | A1 * | 6/2013 | Moorthi | G06F 11/368 717/124 |
| 2014/0380278 | A1 * | 12/2014 | Dayan | G06F 11/3692 717/124 |
| 2017/0019314 | A1 * | 1/2017 | Chieu | H04L 41/5054 |

\* cited by examiner

*Primary Examiner* — Kambiz Zand
*Assistant Examiner* — Arezoo Sherkat
(74) *Attorney, Agent, or Firm* — Holland & Hart LLP

(57) ABSTRACT

In some database systems, multiple servers may be deployed with different configurations based on stacks, applications, or services associated with the servers. Such systems may perform server validations to determine whether the servers are deployed with the correct configurations. A testing server may validate one or more target servers using metadata and parameters of the target servers. The testing server may receive parameters corresponding to a configuration file, and the testing server may select a subset of validation routines to perform for each target server based on metadata in the configuration file. In this way, the testing server may perform the same validation process for each target server, but may perform a different subset of validation routines. The testing server may execute code containing the selected subset of validation routines remotely against the target server, and may determine whether the server was configured correctly.

16 Claims, 12 Drawing Sheets

FLEXIBLE REMOTE SERVER VALIDATION

FIELD OF TECHNOLOGY

The present disclosure relates generally to database systems and data processing, and more specifically to flexible remote server validation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may include a network of servers, and each server may be configured with settings specific to the environment and functionality of that server. In some cases, large numbers of these servers (e.g., thousands) may be deployed and configured in a short period of time. Each server may need to be individually validated to ensure that the unique configurations of that server were correctly configured. In some cases, validating a server may include manually checking the configurations of that server, and may also require having physical access to the server to perform the validation procedure. Such limitations may cause inefficiencies and other restrictions when validating a number of servers with different configurations at various locations.

DETAILED DESCRIPTION

In some database systems, multiple servers may be deployed with different server configurations. For example, when deployed, a server may be configured for a specific stack, and may install certain applications or services based on the environment and functionality for that server. Following deployment of a server, the system may perform a validation process to determine whether the server is configured correctly. Additionally, if a server is modified (e.g., if a new tenant, application, or service is assigned to the server), the system may perform an additional validation process based on the configuration modification.

To perform the validation process, a testing server may remotely validate one or more target servers. The testing server may receive parameters for a target server, for example, from a user or the target server. The parameters may correspond to one or more configuration files stored at the testing server. The target server may send the parameters based on a validation request from the testing server, a configuration trigger, or a pre-determined periodicity. The testing server may read the metadata from the corresponding configuration files, and may select a subset of validation routines to perform on the target server based on the metadata. The selected subset of validation routines may test whether the target server is configured as intended. The testing server may execute code containing the selected subset of validation routines remotely against the target server, and may determine whether the server passes the validation routines. In some cases, the target server may perform configuration updates based on any failed validation routines.

The testing server may contain a set of validation routines for determining the correct configuration for multiple different servers and server configurations within the database system. The testing server may perform the same validation process (e.g., receive the same parameters, execute the same code in order to determine the validation routines to perform, etc.) on different servers, but may select different subsets of validation routines to perform. In this way, the testing server may flexibly validate any server within the system using the same validation module, which may decrease latency, complexity, and user input in the server validation process.

Aspects of the disclosure are initially described in the context of an environment supporting an on-demand database service. Aspects of the disclosure are then described in the context of a system, process, architecture, and process flow relating to flexible remote server validation. Aspects of the disclosure are further illustrated by and described with reference to apparatus diagrams, system diagrams, and flowcharts that relate to flexible remote server validation.

Figure 1:
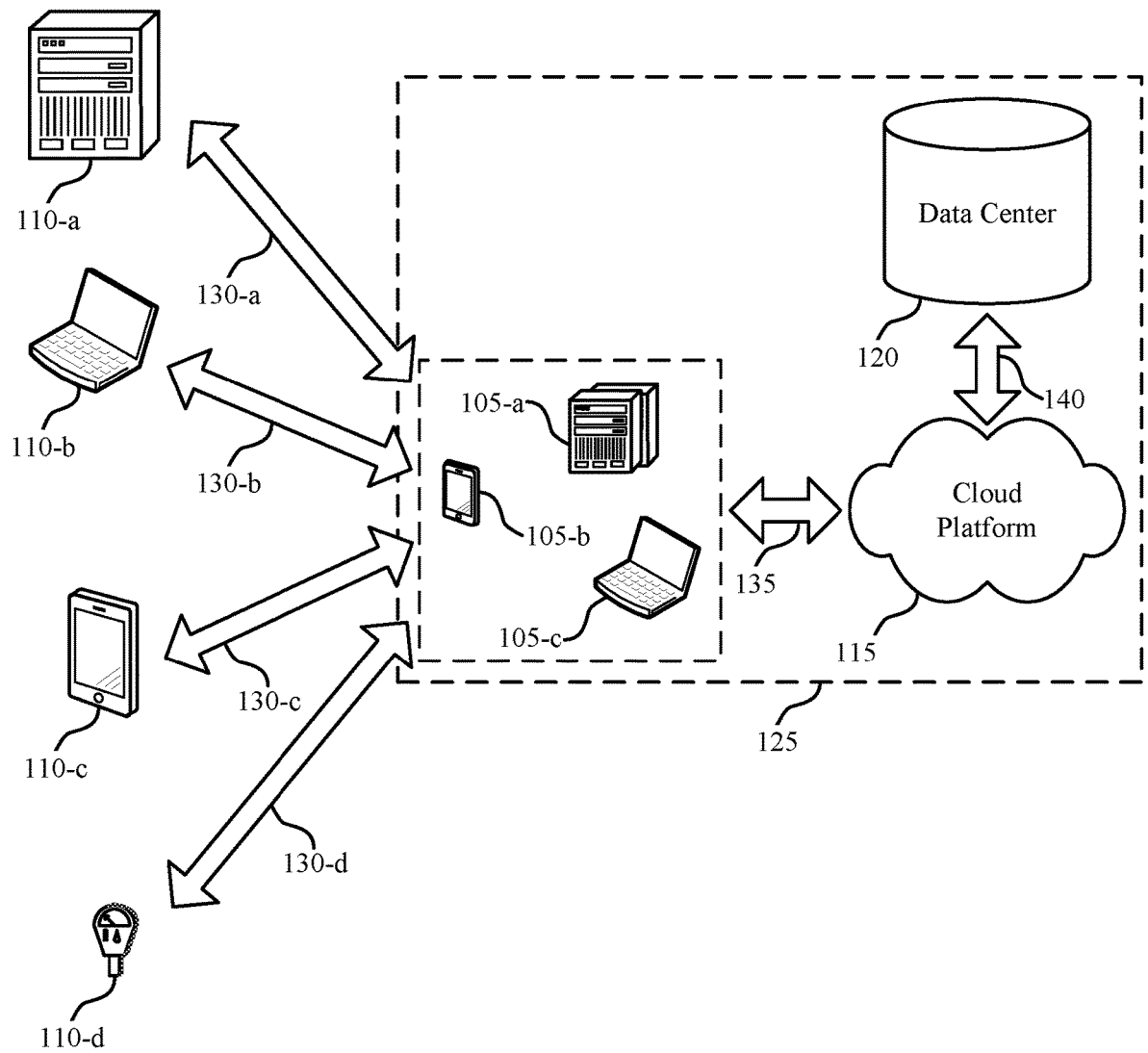
FIG. 1 illustrates an example of a system for validating a plurality of target servers that supports flexible remote server validation in accordance with aspects of the present disclosure.

FIG. 1 illustrates an example of a system 100 for cloud computing that supports flexible remote server validation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Subsystem 125 may include multiple servers. Different servers in subsystem 125 may be configured with different settings (e.g., based on tenants or cloud clients 105 assigned to the server, stacks assigned to the server, applications or services installed to run on the server, etc.). To determine whether a server is configured with the correct settings, a testing server may perform a validation process on the server. The testing server may implement flexible remote server validation techniques. For example, the testing server may receive a set of parameters. Based on the set of parameters, the testing server may identify metadata associated with one or more configuration files. From a set of possible validation routines for the servers of the subsystem 125, the testing server may select a subset of validation routines corresponding to the specific server. The testing server may then remotely execute the selected subset of validation routines against the server, and may determine whether the server is configured correctly to support the associated tenants, stack, applications, and services. The automatic selection of a subset of validation routines based on an input (e.g., a configuration input file) may facilitate efficient and scalable server validation processes for many servers with differing setup configurations. Additionally, remotely testing servers (as opposed to having to be physically at the server to validate it) may facilitate efficiently validating servers in various locations from one central location.

Figure 2:
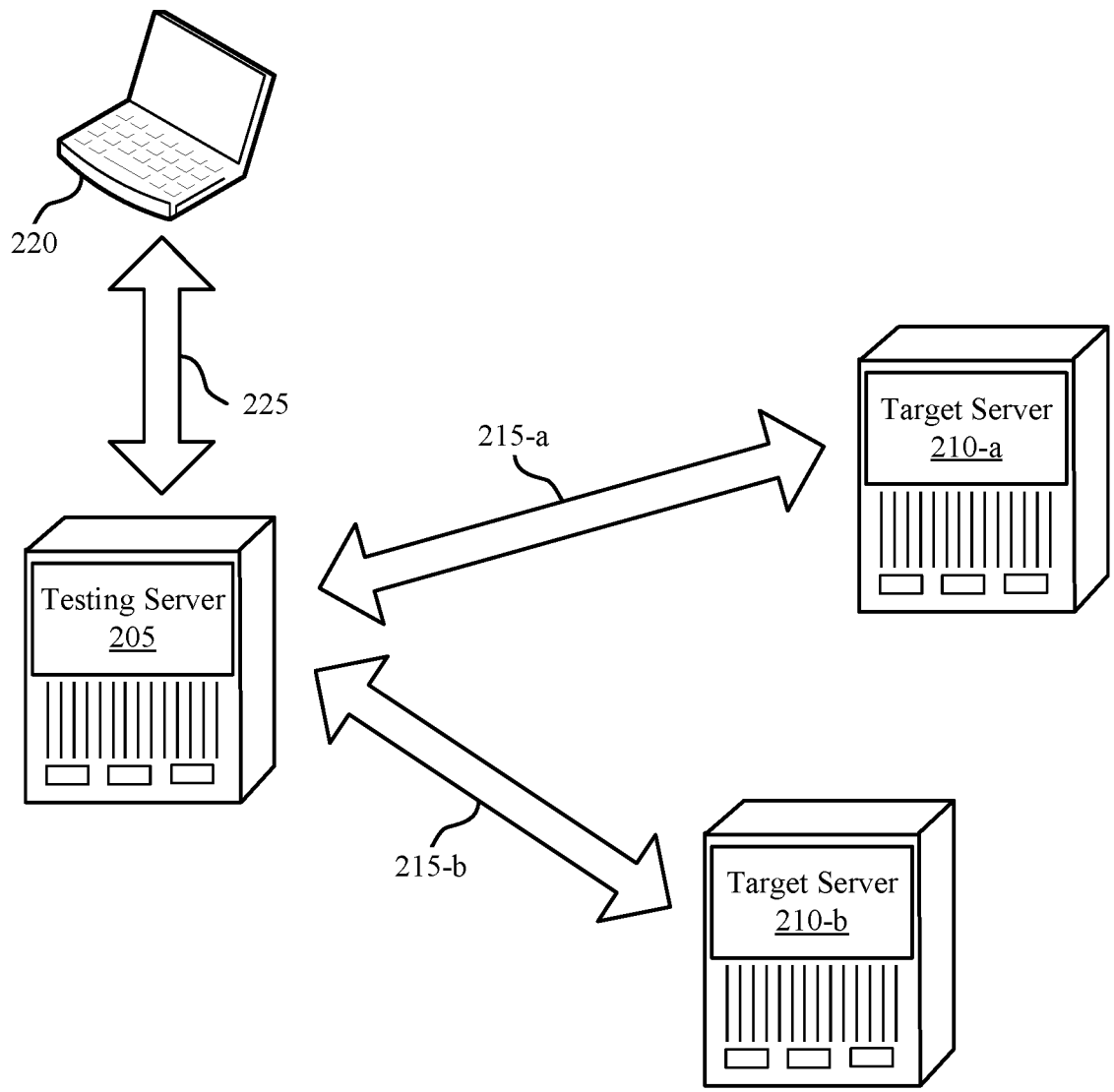
FIG. 2 illustrates an example of a system that supports flexible remote server validation in accordance with aspects of the present disclosure.

FIG. 2 illustrates an example of a system 200 that supports flexible remote server validation in accordance with various aspects of the present disclosure. The system 200 may include multiple deployed servers, such as a testing server 205 and one or more target servers 210, which may be components of the subsystem 125 as described with reference to FIG. 1. Each server may be an example of a single working server or a server cluster (e.g., one or more servers interconnected to function as a single entity). In some cases, the system 200 may additionally include a user device 220, which may communicate with the testing server 205 over communication link 225. The system 200 may support remote server validation for multiple server configurations.

The system 200 or a user associated with the system 200 may deploy a target server 210 configured for a specific function. In some cases, deploying the server 210 may include automatically configuring the settings and installing one or more applications for the target server 210. The server configuration may be based on a stack or environment of the target server 210, an application for the target server 210, one or more services provided on the target server 210, or some combination of these factors. For example, a system 200 may include a number of stacks (e.g., nine stacks), and each target server 210 may be assigned to a stack. The stack may be an example of a tenant-specific stack or a multi-tenant stack. Similarly, a server may be one of a number of different server or application types (e.g., the Windows infrastructure may include 45 different server types). Furthermore, each target server 210 may include support for one or more services (e.g., such as marketing cloud services). In some cases, as tenants join the system 200 and are assigned to a target server 210, a user or the system 200 may update the applications or services provided by the target server 210 based on preferences or requirements of the additional tenants. In such cases, the target server 210 may undergo an additional validation process following the modification of the server configuration (e.g., in addition to a validation process performed to validate correct deployment of the target server 210).

The testing server 205 may implement a server test runner. In some cases, the server test runner may implement a behavior driven development (BDD) style testing framework. In such cases, the server test runner may use a Pester module or test runner (e.g., a Windows PowerShell NUnit BDD framework) to validate one or more target servers 210. The testing server 205 may modify the Pester test runner to operate remotely on the target servers 205, rather than locally. For example, the testing server 205 may operate the Pester test runner remotely on target server 210-*a* and target server 210-*b*. This may improve validation testing efficiency, as both target servers 210-*a* and 210-*b* may not have to download or be configured with the server test runner. For remote operation, the server test runner may include executable code of a different style than locally-run code. In some cases, remote operation may also involve additional security protocols to protect data transferred between the testing server 205 and the one or more target servers 210.

Testing server 205 may implement a validation module, which may include the BDD style testing framework. The validation module may include a set of validation tests, which may also be referred to as validation routines. Each validation test may be reusable (e.g., the same validation tests may be performed on target server 210-*a* and target server 210-*b*, without cleaning any memory or changing any code at the testing server 205). The validation tests may be grouped into sets of tests for specific areas of application server validation. For example, the validation module may include a set of tests for one or more files, one or more folders, one or more server roles, one or more registries, one or more services, or any other similar grouping of validation tests, or some combination of these.

The testing server 205 may first determine whether to run a set of validation tests. For example, the testing server 205 may determine whether a specific target server 210 (e.g., target server 210-*a*) contains a file, folder, server role, registry key, service, or similar parameter or component. If the testing server determines target server 210-*a* contains any of the above, the testing server 205 may select one or more further validation tests based on the parameters of target server 210-*a*. For example, if the testing server 205 identifies a folder at target server 210-*a*, the testing server 205 may run further tests to identify whether certain permissions are set for the folder. Similarly, if the testing server 205 identifies a registry key for target server 210-*a*, the testing server 205 may further determine a value of the registry key, and may validate whether this is a correct registry key value for target server 210-*a*.

One specific implementation example for a service validation test is presented below:

```

# Sevice.Tests.ps1

If ( $serverData.Services ) {
    Describe "Service Validation" {
        Foreach ( $service in $services ) {
            $serviceName = $service.name
            Context "$serviceName Service" {
                $path = $service.pathExecutable
                $userName = $service.UserName
                $svc = Get-CimInstance -ClassName win32_Service
                -Filter "Name like '$serviceName'" -ComputerName
```

```
$serverName
            $svcPath = $svc.PathName
            $svcPath = $svcPath.replace ( "\"" , "\"" )
            It "Service $servicename should be installed" {
                $svc | Should be $true
            }
            If ( $svc ) {
                It "Service $serviceName Path should be $path" {
                    $svcPath | Should be $path
                }
                It "Service $serviceName User should be $userName" {
                    $svc.StartName | Should Be $userName
                }
                If ( $svc.StartMode -eq 'Auto' ) {
                    It "Service $serviceName should be running" {
                        $svc.state | Should be "Running"
                    }
                }
            }
        }
    }
}
```

The testing server 205 may execute the above code or a similar version of code based on inputs from a target server 210, or the testing server 205 may determine one or more code snippets to process, and may send the code to a target server 210 for execution at the target server 210.

In some cases, the testing server 205 may include code or code snippets for validating any possible target server 205 configuration defined for the system 200. The code may therefore be reusable, as for any target server 210, the testing server 205 may include a subset of code within the full set of validation code that corresponds to the specific target server 210.

The testing server 205 may receive information from the target servers 210 or from a user (e.g., based on input parameters from a user device 220) to perform the validation routines. In some cases, the testing server 205 may transmit a validation request to a target server 210 over a communication link 215 (e.g., to validate target server 210-*a*, the testing server 205 may send the validation request over communication link 215-*a*). The testing server 215 may send the validation request after deployment but before operation of the target server 210. In some cases, a user may input a validation command into a user device 220, and the user device may instruct the testing server 205 to perform the validation process for the target server 210. In other cases, a user may input a validation command directly into the testing server 205, or the testing server 205 may automatically determine to send a validation request. For example, the testing server 205 may automatically send the validation request based on a pre-determined periodicity or a trigger, such as a new deployment trigger or a configuration modification trigger.

The target server 210 may transmit information about its server configuration to the testing server 205 over a communication link 215. In some cases, the target server 210 may transmit the information based on receiving a validation request from the testing server 205. In other cases, the target server 210 may automatically transmit the information following server deployment, server modification, or based on a pre-determined periodicity. The information may include parameters corresponding to the target server 210, such as server, stack, environment, or service information. For example, the parameters may include a stack identifier, a server type identifier, an application type identifier, or some combination of these or similar parameters related to the target server 210 configuration. In other examples, a user may input the parameters into a user device 220 or the testing server 205. For example, a user may identify the intended configuration for a target server 210, and may input a set of parameters corresponding to the intended configuration. This inputting of parameters may trigger the validation process.

Depending on the information received from the target server 210 or the user, the testing server 205 may search for stored configuration data corresponding to the information. In some cases, the configuration data may be organized in one or more configuration files, which may include sets of key-value pairs. For example, the testing server 205 may include a stack configuration file (e.g., relating to environment-specific information, user accounts, or any other metadata shared by all servers across a stack), a server or application type configuration file (e.g., relating to server roles, files or folders to be installed, etc.), a services configuration file (e.g., services that may be shared across a subset of server types), or any other relevant configuration file including information to validate at the target server 210. These configuration files may be examples of JavaScript object notation (JSON) files.

Based on the configuration files or the received parameters, the testing server 205 may select a subset of validation routines or tests to perform. In some cases, the testing server 205 may input the configuration data (e.g., in the configuration file format) into code executable by a processor at the testing server 205. Executing the code at the testing server 205 may automatically select certain validation routines to run for the target server 210 based on the input information. In other cases, the testing server 205 may parse through the information received in the configuration files, and may generate code based on the information. For example, the testing server 205 may include a list of code snippets, where each code snippet corresponds to a validation test or routine. The testing server 205 may aggregate specific code snippets based on the received information, and either the testing server 205 or the target server 210 may process the generated code to validate whether the server is configured as intended.

The testing server 205 may transmit a validation instruction message to the target server 210. In some cases, the validation instruction message may include an indication of the subset of validation routines selected at the testing server 205. For example, if the validation routines are performed at the testing server 205, the indications may specify whether a validation routine is successful or not successful. In other cases, the validation instruction message may include code to be executed at the target server 210, where the code includes the selected subset of validation routines. Additionally, the validation instruction message may include expected results for the validation routines (e.g., based on the input parameters or the configuration files). The target server 210 may process the code based on settings or metadata at the target server 210, and may validate whether the target server 210 is configured as intended based on performing the selected validation routines. In some cases, the target server 210 may transmit a validation result message to the testing server 205, and the testing server 205 may transmit an indication of the validation results to the user device 220. The user device 220 may display results of the validation process in a user interface. The results may include whether the target server 210 is configured correctly, and may additionally include an indication of any settings that do not match the intended configuration. In some cases, the target server 210 may modify its settings or configuration based on performing the validation process or receiving the validation instruction message. In this way, the target server 210 may adjust any settings to correctly match its intended configuration.

Based on the flexible nature of the validation module, the testing server 205 may perform different validation routines or tests for different target servers 210. For example, the testing server 205 may receive a first set of parameters for target server 210-*a* (e.g., over communication link 215-*a* or 225), and may receive a second set of parameters for target server 210-*b* (e.g., over communication link 215-*b* or 225). The testing server 205 may identify corresponding configuration files for the first and second sets of parameters. Based on the different configuration files, testing server 205 may select different validation tests for each of the target servers 210-*a* and 210-*b*, and the testing server 205 or the target servers 210 may execute different lines of code in order to perform validation on the target servers 210. Accordingly, the validation module may perform a same data-driven process to validate each target server 210 within the system 200. In some cases, the validation module may perform the validation processes without any user input.

Figure 3:
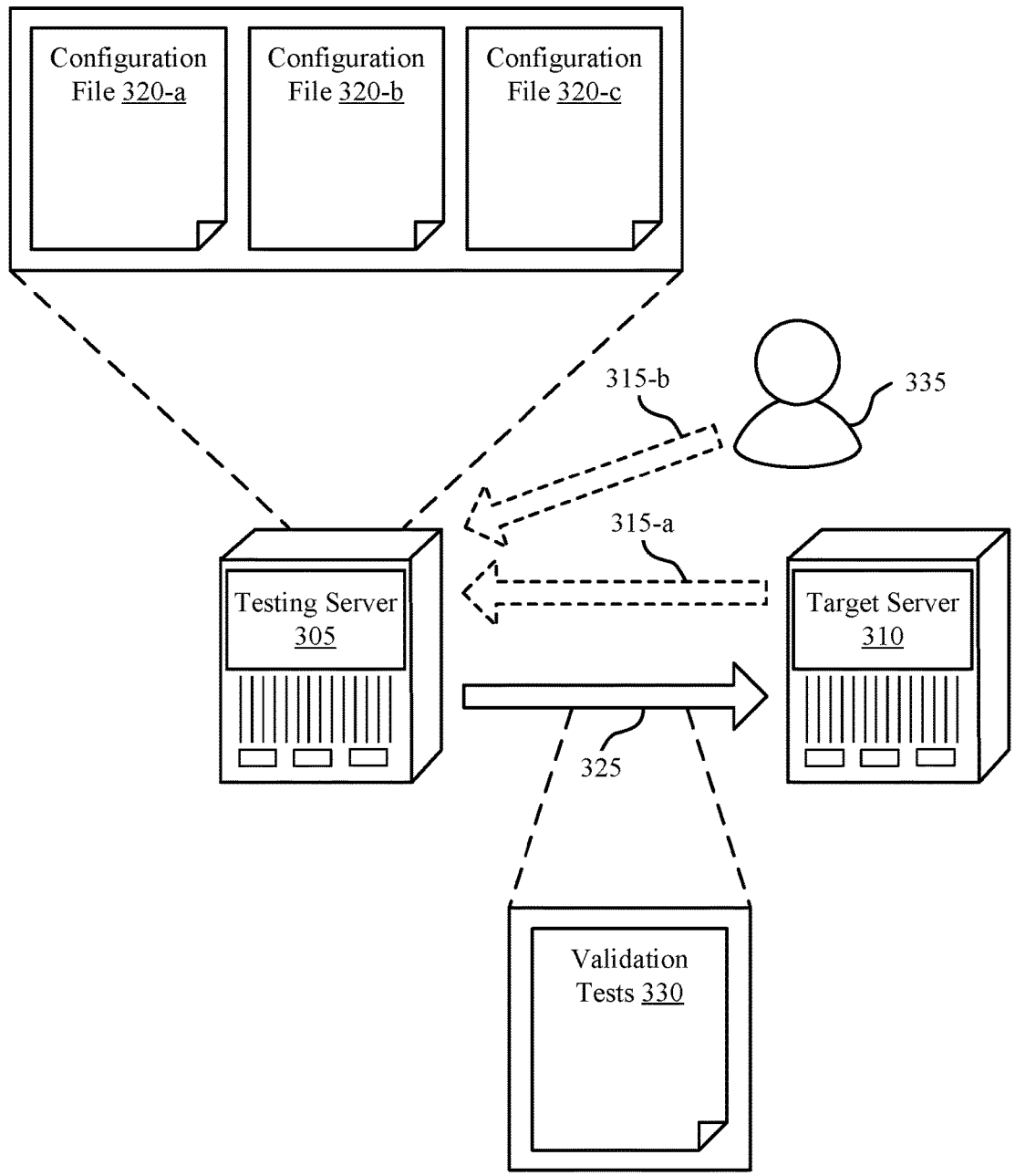
FIG. 3 illustrates an example of a server validation process that supports flexible remote server validation in accordance with aspects of the present disclosure.

FIG. 3 illustrates an example of a server validation process 300 that supports flexible remote server validation in accordance with various aspects of the present disclosure. The server validation process 300 may include a testing server 305 and a target server 310, which may be examples of the testing server 205 and target servers 210 described with reference to FIG. 2. The server validation process 300 may be an example of a flexible remote server validation process.

The testing server 305 may perform the server validation process 300 on the target server 310. In some cases, the target server 310 may initiate the process upon completion of a deployment or modification process. In these cases, the target server 310 may transmit one or more parameters to the testing server 305 on communication link 315-*a*. In some cases, the parameters may be stored at the target server 310. In other cases, the target server 310 may search its settings and metadata in order to determine the parameters. Alternatively, a user 335 may input the parameters into the testing server 305, or into a user device that may communicate with the testing server 305 over communication link 315-*b*. In some cases, the communication links 315 may support transport layer security (TLS) protocols to protect the transfer of the parameters.

The testing server 305 may receive the parameters, and may identify the corresponding configuration files 320, for example, by calling a test to gather metadata for the configuration files 320. In some cases, the testing server 305 may combine the metadata, and may build a data model containing the metadata to be read by the testing server 305. In certain examples, the testing server 305 may identify a number (e.g., three) of separate configuration files 320 corresponding to the parameters. In other cases, the testing server 305 may aggregate the metadata information, and may generate a single configuration file 320. As illustrated, the testing server 305 may identify a stack configuration file 320-*a*, an application type configuration file 320-*b*, and a services configuration file 320-*c*.

The testing server 305 may read the metadata from the configuration files 320, and may select a subset of validation tests 330 or routines based on the metadata. For example, the testing server 305 may input the configuration files 320 into code stored at the testing server 305, and the code may determine the subset of validation tests 330. The testing server 305 may generate executable code based on the selected subset of validation tests. In some cases, the testing server may determine validation tests 330 based on the stack configuration file 320-a, the application type configuration file 320-b, and the services configuration file 320-c. For example, the testing server 305 may determine whether to run a certain validation routine (e.g., if a corresponding metadata value is passed in from the configuration files 320) or to skip the validation routine (e.g., if the corresponding metadata is not defined). In many cases, the testing server 305 may skip multiple validation routines based on the intended configuration of the target server 310.

The testing server 305 may remotely execute the subset of validation tests 330 on the target server 310. For example, in some cases, the testing server 305 may execute the code at a processor component of the testing server 305, and may request setting values from the target server 310 over communication link 325. In other cases, the testing server 305 may send the code containing the subset of validation tests 330 over communication link 325 to the target server 310. The target server 310 may execute the received code at a processor in order to perform the validation tests. The target server 310 may additionally receive expected results for the validation tests 330 from the testing server 305 based on the parameters or configuration files 320, and may compare the results of the executed validation tests 330 to the expected results. In some cases, the target server 310 may automatically modify its configurations or setting parameters based on the validation test results. For example, if the validation tests determine an incorrect setting at the target server 310 for the intended server configuration, the target server 310 may update the setting to contain the intended value.

Figure 4:
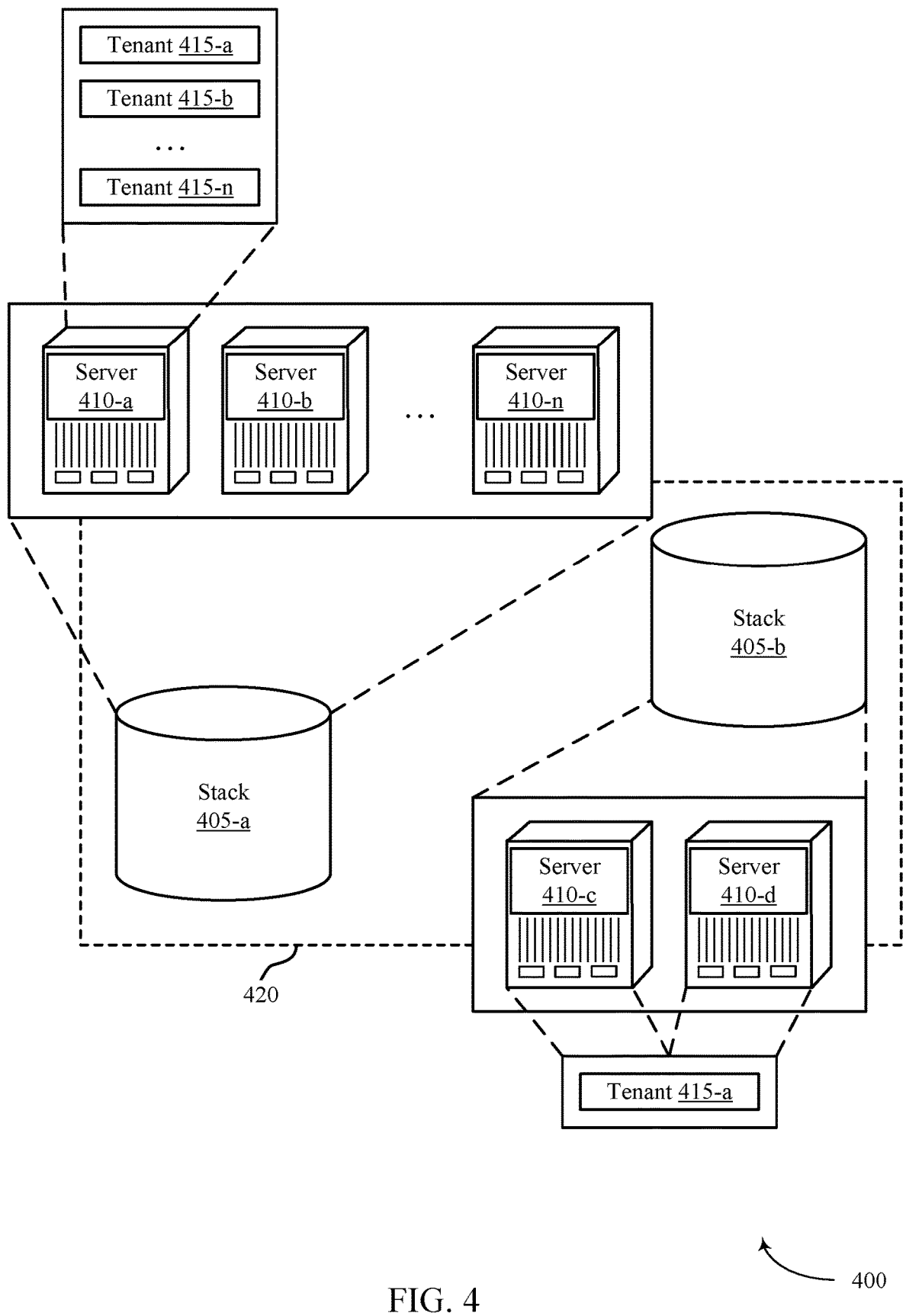
FIG. 4 illustrates an example of a server deployment architecture that supports flexible remote server validation in accordance with aspects of the present disclosure.

FIG. 4 illustrates an example of a server deployment architecture 400 that supports flexible remote server validation in accordance with various aspects of the present disclosure. The server deployment architecture 400 may include one or more stacks 405. Each stack may include a set of servers 410, and each server may support one or more tenants 415. The servers 410 may be examples of the testing servers 205 and 305 or target servers 210 and 310, as described with reference to FIGS. 2 and 3. The stacks may be components of a system 420, which in some cases may be an example of a data center 120, as described with reference to FIG. 1. The server deployment architecture 400 may include one or more servers 410 to perform validation processes on other servers 410. In some cases, these testing servers 410 may be included in a stack 405, while in other cases, the testing servers 410 may be components of a separate validation server cluster or architecture.

A stack 405 (e.g., stack 405-a) may contain a set of servers 410. For example, stack 405-a includes server 410-a, server 410-b, up to a last server 410-n. Each server 410 included in stack 405-a may share the same stack configuration. Each server 410 may support one or more tenants 415. For example, server 410-a may support tenant 415-a, tenant 415-b, up to a last tenant 415-n. Stack 405-a may be an example of a multi-tenant stack, and server 410-a may be an example of a multi-tenant server, as each supports multiple different tenants 415. In contrast, stack 405-b may be an example of a tenant-specific stack. For example, stack 405-b and its servers (e.g., server 410-c and server 410-d) may support a single tenant 415-a. In some cases, this single tenant 415-a may be a tenant also supported by stack 405-a. In other cases, the tenant 415 supported by tenant-specific stack 405-b may only be supported by tenant-specific stacks.

The intended configuration for a server 410 may be based on many different parameters. For example, the configuration for server 410-a may be based on a stack configuration for stack 405-a, application or service configurations for tenants 415-a through 415-n, system configurations for system 420, server-specific configurations for server 410-a, or any combination of these configurations. A testing server 410 may remotely execute validation routines against server 410-a for each of these configurations, and may not execute validation routines for other configurations that are not intended for server 410-a.

Figure 5:
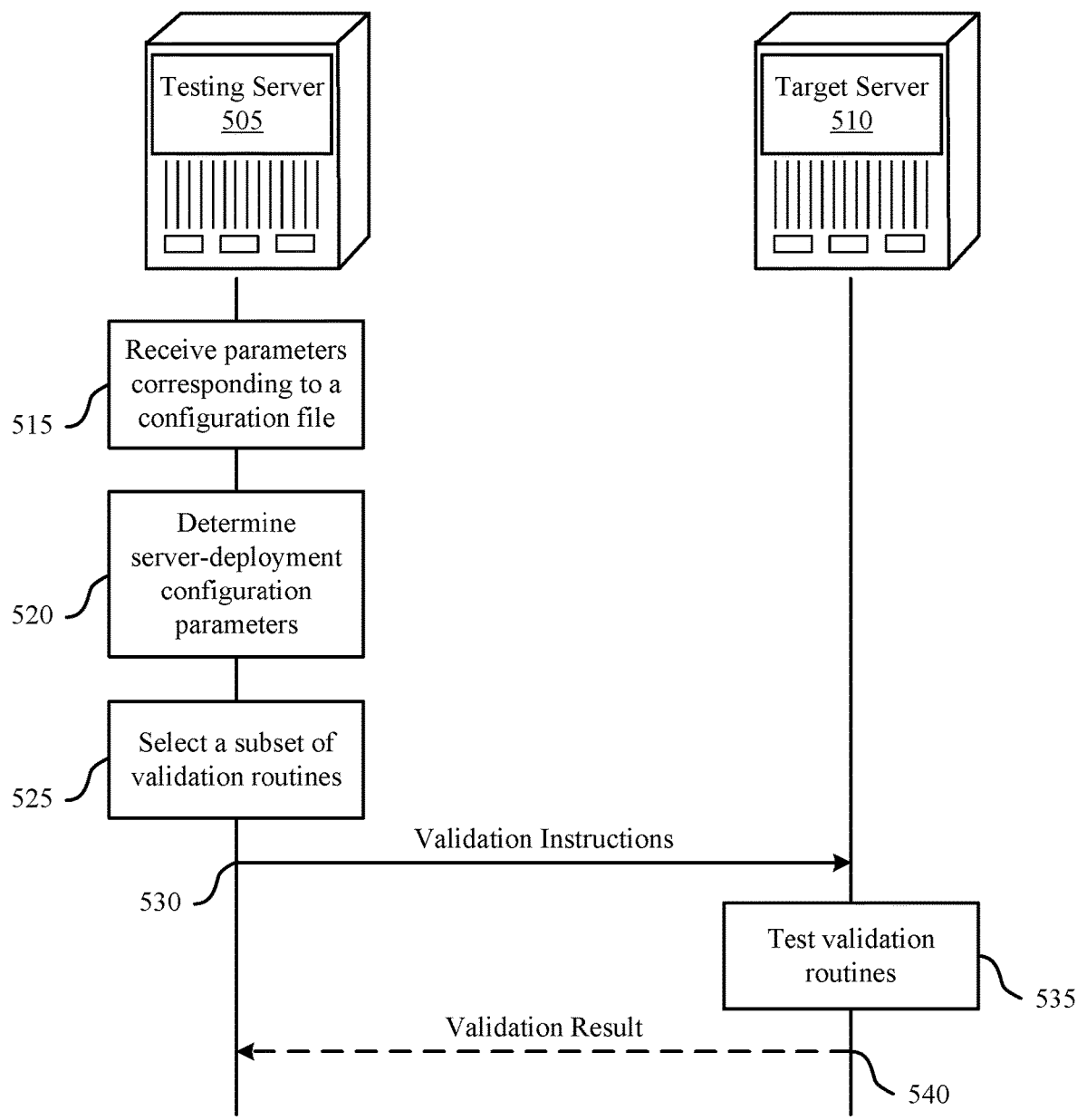
FIG. 5 illustrates an example of a process flow that supports flexible remote server validation in accordance with aspects of the present disclosure.

FIG. 5 illustrates an example of a process flow 500 that supports flexible remote server validation in accordance with various aspects of the present disclosure. The process flow 500 may include a testing server 505 and a target server 510, which may be examples of the corresponding devices described with reference to FIGS. 2 through 4. The process flow 500 may illustrate a validation process for the target server 510, which may be part of a group of target servers. In some cases, the testing server 505 may validate other target servers 510 of the group, where the validation process may automatically adapt to handle multiple different target server configurations.

At 515, the testing server 505 may receive parameters corresponding to a configuration file. The testing server 505 may receive the parameters from a user or from the target server 510. In some cases, the target server 510 may transmit one or more configuration files based on a validation request from the testing sever 505. For example, the target server 510 may be deployed in a system, and the testing server 505 may transmit a validation request to the target server 510 within a certain time period in order to validate the server deployment. The configuration file may include a set of server-deployment configuration parameters corresponding to an intended configuration of the target server 510. The configuration file may be an example of a stack configuration file, an application type configuration file, a server type configuration file, a service configuration file, a JSON file, or some combination of these.

At 520, the testing server 505 may determine server-deployment configuration parameters. For example, the testing server 505 may compare the set of server-deployment configuration parameters to a set of possible server-deployment configuration parameters. The set of possible server-deployment configuration parameters may correspond to all server configurations for the group of target servers.

At 525, the testing server 505 may select a subset of validation routines that test for successful server deployment of the target server 510. The testing server 505 may select the subset of validation routines from a set of possible validation routines for the group of target servers. The selected subset of validation routines may correspond to the intended configuration of the target server 510. In some cases, the set of possible validation routines may include a set of validation smoke tests that may check many configuration parameters for the group of target servers.

In some cases, the processes at 520 and 525 may be performed based on executing code at the testing server 505. For example, the testing server 505 may input the configuration file into code executable by a processor of the testing server 505. Executing the code may determine the server-deployment configuration parameters, select a subset of validation routines, generate a validation instruction messages (e.g., which may include code executable at the target server 510 to perform the validation routines), or some combination of these.

At 530, the testing server 505 may transmit a validation instruction message to the target server 510. The validation instruction message may include the selected subset of validation routines corresponding to the intended configuration of the target server 510. In some cases, the validation instruction message may be an example of a BDD test runner, a Pester test runner, or both.

At 535, the target server 510 may perform validation tests based on the selected subset of validation routines. In some cases, the target server 510 may execute code based on the validation instruction message in order to perform the validation routines. The validation routines may identify settings, configurations, applications, or programmable code at the target server 510, and may determine whether these identified parameters match the intended configuration of the target server 510.

At 540, the target server 510 may optionally transmit a validation result message to the testing server 505 in response to the validation instruction message. For example, the target server 510 may perform the validation tests at 535, may determine one or more results based on the subset of validation routines, and may transmit an indication of the one or more results to the testing server 505. In some cases, the testing server 505 may transmit this validation result message to a user interface to be displayed to a user.

Figure 6:
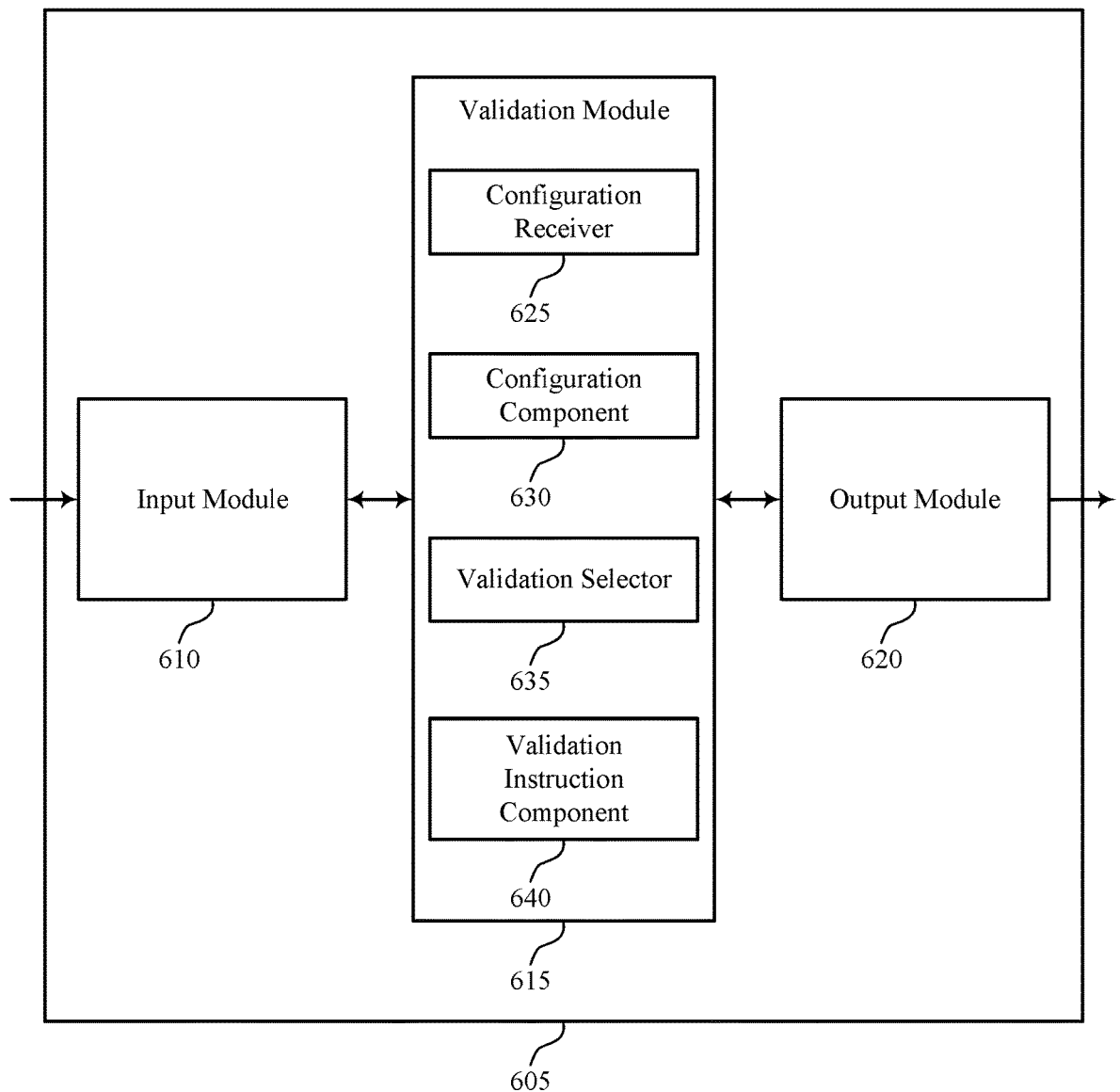
FIGS. 6 and 7 show block diagrams of a device that supports flexible remote server validation in accordance with aspects of the present disclosure.

FIG. 6 shows a block diagram 600 of an apparatus 605 that supports flexible remote server validation in accordance with aspects of the present disclosure. Apparatus 605 may include input module 610, validation module 615, and output module 620. Apparatus 605 may also include a processor. Each of these components may be in communication with one another (e.g., via one or more buses). In some cases, apparatus 605 may be an example of a user terminal, a database server, or a system containing multiple computing devices. Validation module 615 may be an example of aspects of the validation module 715 or 815 described with reference to FIGS. 7 and 8. Validation module 615 may also include configuration receiver 625, configuration component 630, validation selector 635, and validation instruction component 640.

Validation module 615 and/or at least some of its various sub-components may be implemented in hardware, software executed by a processor, firmware, or any combination thereof. If implemented in software executed by a processor, the functions of the validation module 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The validation module 615 and/or at least some of its various sub-components may be physically located at various positions, including being distributed such that portions of functions are implemented at different physical locations by one or more physical devices. In some examples, validation module 615 and/or at least some of its various sub-components may be a separate and distinct component in accordance with various aspects of the present disclosure. In other examples, validation module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Configuration receiver 625 may receive, at a testing server, parameters related to a configuration file including a first set of server-deployment configuration parameters corresponding to an intended configuration of a target server of a set of target servers. Additionally, configuration receiver 625 may receive, at the testing server, additional parameters related to a second configuration file including a second set of server-deployment configuration parameters corresponding to a second intended configuration of a second target server of the set of target servers. In some cases, the target server and the second target server are configured for different applications. In some cases, the configuration file includes a stack configuration file, an application type configuration file, a server type configuration file, a service configuration file, a JSON file, or a combination thereof.

Configuration component 630 may compare the first set of server-deployment configuration parameters to a set of possible server-deployment configuration parameters for the set of target servers, and in some cases may additionally compare the second set of server-deployment configuration parameters to the set of possible server-deployment configuration parameters for the set of target servers.

Validation selector 635 may select a subset of validation routines that test for successful server deployment from a set of possible validation routines for the set of target servers, where the subset of validation routines corresponds to the intended configuration. Validation selector 635 may additionally select a second subset of validation routines from the set of possible validation routines for the set of target servers, where the second subset of validation routines corresponds to the second intended configuration and is different from the subset of validation routines.

Validation instruction component 640 may transmit, to the target server, a validation instruction message, where the validation instruction message includes the subset of validation routines. Validation instruction component 640 may additionally transmit, to the target server, a second validation instruction message, where the second validation instruction message includes the second subset of validation routines. In some cases, the validation instruction message includes a BDD test runner, a Pester test runner, or a combination thereof.

Figure 7:
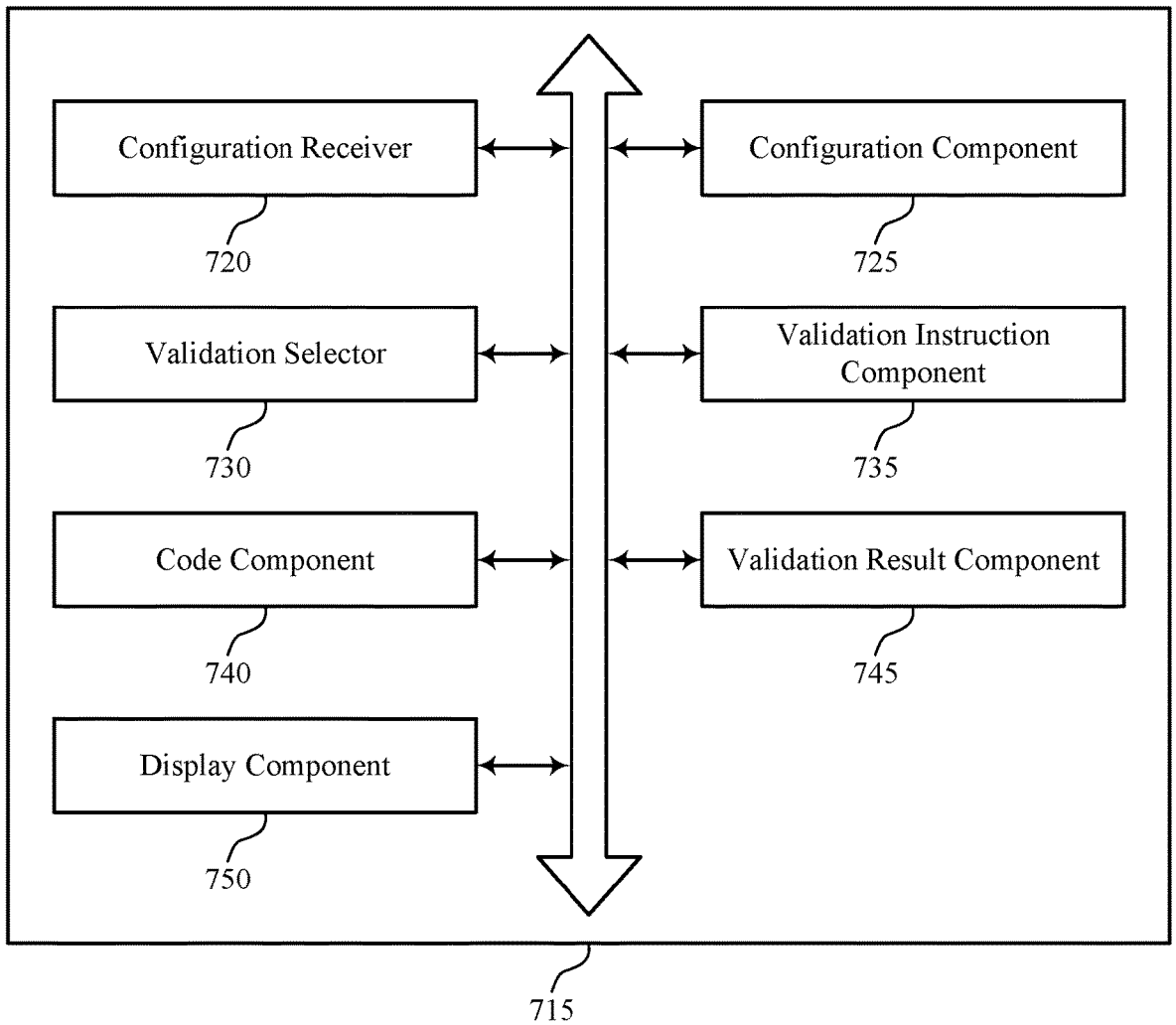

FIG. 7 shows a block diagram 700 of a validation module 715 that supports flexible remote server validation in accordance with aspects of the present disclosure. The validation module 715 may be an example of aspects of a validation module 615 or 815 described with reference to FIGS. 6 and 8. The validation module 715 may include configuration receiver 720, configuration component 725, validation selector 730, validation instruction component 735, code component 740, validation result component 745, and display component 750. Each of these modules may communicate, directly or indirectly, with one another (e.g., via one or more buses).

Configuration receiver 720 may receive, at a testing server, parameters corresponding to a configuration file including a first set of server-deployment configuration parameters corresponding to an intended configuration of a target server of a set of target servers. In some cases, configuration receiver 720 may additionally receive, at the testing server, additional parameters corresponding to a second configuration file including a second set of server-deployment configuration parameters corresponding to a second intended configuration of a second target server of the set of target servers. In some cases, the target server and the second target server are configured for different applications. In some cases, the configuration file includes a stack configuration file, an application type configuration file, a server type configuration file, a service configuration file, a JSON file, or a combination thereof.

Configuration component 725 may compare the first set of server-deployment configuration parameters to a set of possible server-deployment configuration parameters for the set of target servers, and in some cases may additionally compare the second set of server-deployment configuration parameters to the set of possible server-deployment configuration parameters for the set of target servers.

Validation selector 730 may select a subset of validation routines that test for successful server deployment from a set of possible validation routines for the set of target servers, where the subset of validation routines corresponds to the intended configuration. In some cases, validation selector 730 may additionally select a second subset of validation routines from the set of possible validation routines for the set of target servers, where the second subset of validation routines corresponds to the second intended configuration and is different from the subset of validation routines.

Validation instruction component 735 may transmit, to the target server, a validation instruction message, where the validation instruction message includes the subset of validation routines. In some cases, validation instruction component 735 may transmit, to the target server, a second validation instruction message, where the second validation instruction message includes the second subset of validation routines. In some cases, the validation instruction message includes a BDD test runner, a Pester test runner, or a combination thereof.

Code component 740 may input the configuration file into code executable by the testing server, where selecting the subset of validation routines from the set of possible validation routines further includes executing the code at the testing server.

Validation result component 745 may receive, from the target server, a validation result message in response to the validation instruction message. Display component 750 may transmit, to a user interface, an indication of the validation result message.

Figure 8:
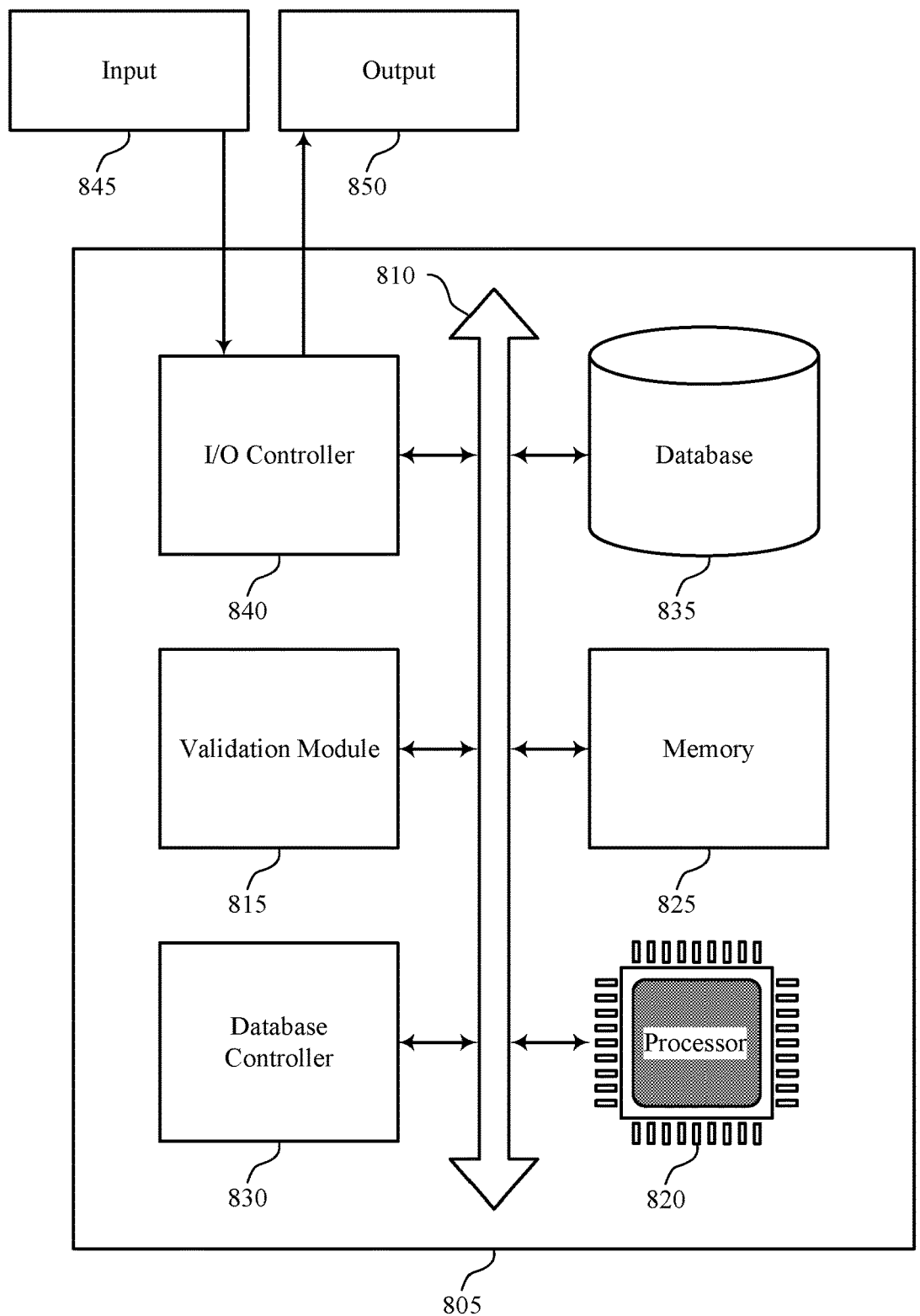
FIG. 8 illustrates a block diagram of a system including a testing server that supports flexible remote server validation in accordance with aspects of the present disclosure.

FIG. 8 shows a diagram of a system 800 including a device 805 that supports flexible remote server validation in accordance with aspects of the present disclosure. Device 805 may be an example of or include the components of testing server 205, 305, or 505 as described above, e.g., with reference to FIGS. 2, 3, and 5. In some cases, device 805 may be a component of subsystem 125 as described with reference to FIG. 1. Device 805 may include components for bi-directional data communications including components for transmitting and receiving communications, including validation module 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting flexible remote server validation).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
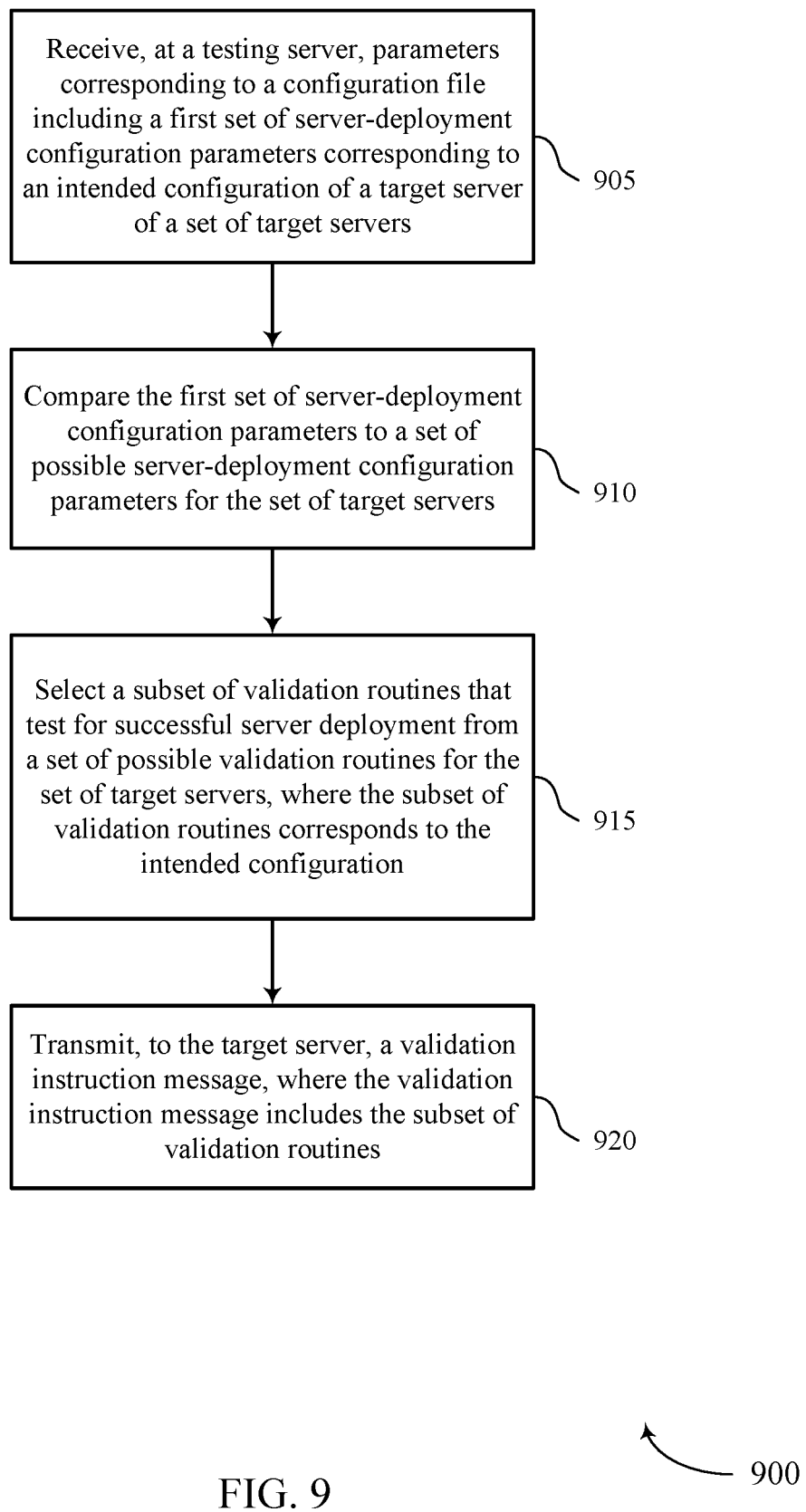
FIGS. 9 through 12 illustrate methods for flexible remote server validation in accordance with aspects of the present disclosure.

FIG. 9 shows a flowchart illustrating a method 900 for flexible remote server validation in accordance with aspects of the present disclosure. The operations of method 900 may be implemented by a testing server 205, 305, or 505 or its components as described herein, e.g., with reference to FIGS. 2, 3, and 5. For example, the operations of method 900 may be performed by a validation module as described with reference to FIGS. 6 through 8. In some examples, a testing server 205, 305, or 505 may execute a set of codes to control the functional elements of the device to perform the functions described below. Additionally or alternatively, the testing server may perform aspects of the functions described below using special-purpose hardware.

At block 905 the testing server may receive parameters corresponding to a configuration file, the configuration file comprising a first set of server-deployment configuration parameters corresponding to an intended configuration of a target server (e.g., such as a target server 210, 310, or 510) of a plurality of target servers. The operations of block 905 may be performed according to the methods described herein. In certain examples, aspects of the operations of block 905 may be performed by a configuration receiver as described with reference to FIGS. 6 through 8.

At block 910 the testing server may compare the first set of server-deployment configuration parameters to a set of possible server-deployment configuration parameters for the plurality of target servers. The operations of block 910 may be performed according to the methods described herein. In certain examples, aspects of the operations of block 910 may be performed by a configuration component as described with reference to FIGS. 6 through 8.

At block 915 the testing server may select a subset of validation routines that test for successful server deployment from a set of possible validation routines for the plurality of target servers, wherein the subset of validation routines corresponds to the intended configuration. The operations of block 915 may be performed according to the methods described herein. In certain examples, aspects of the operations of block 915 may be performed by a validation selector as described with reference to FIGS. 6 through 8.

At block 920 the testing server may transmit, to the target server, a validation instruction message, wherein the validation instruction message comprises the subset of validation routines. The operations of block 920 may be performed according to the methods described herein. In certain examples, aspects of the operations of block 920 may be performed by a validation instruction component as described with reference to FIGS. 6 through 8.

Figure 10:
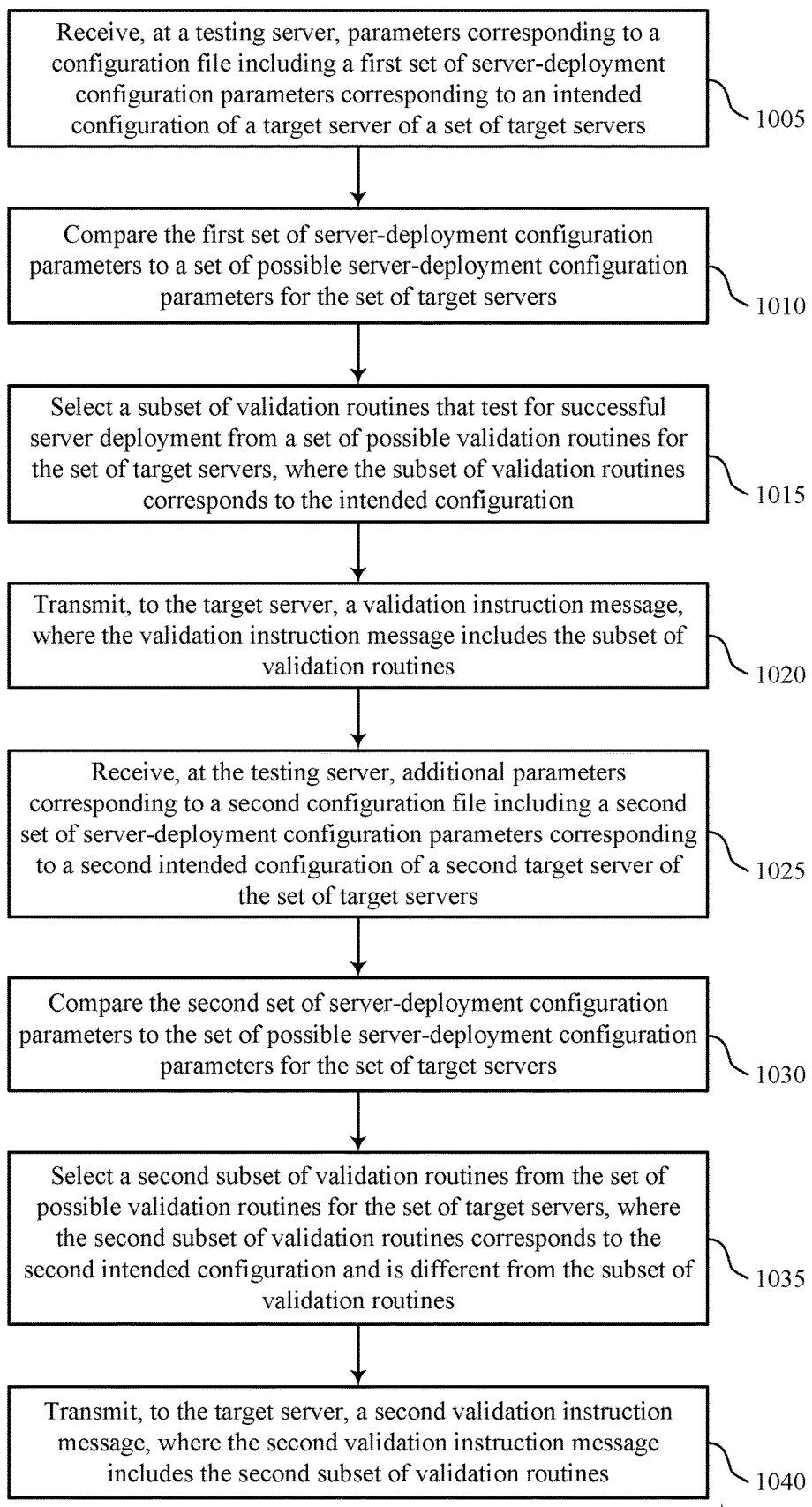

FIG. 10 shows a flowchart illustrating a method 1000 for flexible remote server validation in accordance with aspects of the present disclosure. The operations of method 1000 may be implemented by a testing server 205, 305, or 505 or its components as described herein, e.g., with reference to FIGS. 2, 3, and 5. For example, the operations of method 1000 may be performed by a validation module as described with reference to FIGS. 6 through 8. In some examples, a testing server 205, 305, or 505 may execute a set of codes to control the functional elements of the device to perform the functions described below. Additionally or alternatively, the testing server may perform aspects of the functions described below using special-purpose hardware.

At block 1005 the testing server may receive parameters corresponding to a configuration file, the configuration file comprising a first set of server-deployment configuration parameters corresponding to an intended configuration of a target server of a plurality of target servers. The operations of block 1005 may be performed according to the methods described herein. In certain examples, aspects of the operations of block 1005 may be performed by a configuration receiver as described with reference to FIGS. 6 through 8.

At block 1010 the testing server may compare the first set of server-deployment configuration parameters to a set of possible server-deployment configuration parameters for the plurality of target servers. The operations of block 1010 may be performed according to the methods described herein. In certain examples, aspects of the operations of block 1010 may be performed by a configuration component as described with reference to FIGS. 6 through 8.

At block 1015 the testing server may select a subset of validation routines that test for successful server deployment from a set of possible validation routines for the plurality of target servers, wherein the subset of validation routines corresponds to the intended configuration. The operations of block 1015 may be performed according to the methods described herein. In certain examples, aspects of the operations of block 1015 may be performed by a validation selector as described with reference to FIGS. 6 through 8.

At block 1020 the testing server may transmit, to the target server, a validation instruction message, wherein the validation instruction message comprises the subset of validation routines. The operations of block 1020 may be performed according to the methods described herein. In certain examples, aspects of the operations of block 1020 may be performed by a validation instruction component as described with reference to FIGS. 6 through 8.

At block 1025 the testing server may receive additional parameters corresponding to a second configuration file, the second configuration file comprising a second set of server-deployment configuration parameters corresponding to a second intended configuration of a second target server of the plurality of target servers. The operations of block 1025 may be performed according to the methods described herein. In certain examples, aspects of the operations of block 1025 may be performed by a configuration receiver as described with reference to FIGS. 6 through 8.

At block 1030 the testing server may compare the second set of server-deployment configuration parameters to the set of possible server-deployment configuration parameters for the plurality of target servers. The operations of block 1030 may be performed according to the methods described herein. In certain examples, aspects of the operations of block 1030 may be performed by a configuration component as described with reference to FIGS. 6 through 8.

At block 1035 the testing server may select a second subset of validation routines from the set of possible validation routines for the plurality of target servers, wherein the second subset of validation routines corresponds to the second intended configuration and is different from the subset of validation routines. The operations of block 1035 may be performed according to the methods described herein. In certain examples, aspects of the operations of block 1035 may be performed by a validation selector as described with reference to FIGS. 6 through 8.

At block 1040 the testing server may transmit, to the target server, a second validation instruction message, wherein the second validation instruction message comprises the second subset of validation routines. The operations of block 1040 may be performed according to the methods described herein. In certain examples, aspects of the operations of block 1040 may be performed by a validation instruction component as described with reference to FIGS. 6 through 8.

Figure 11:
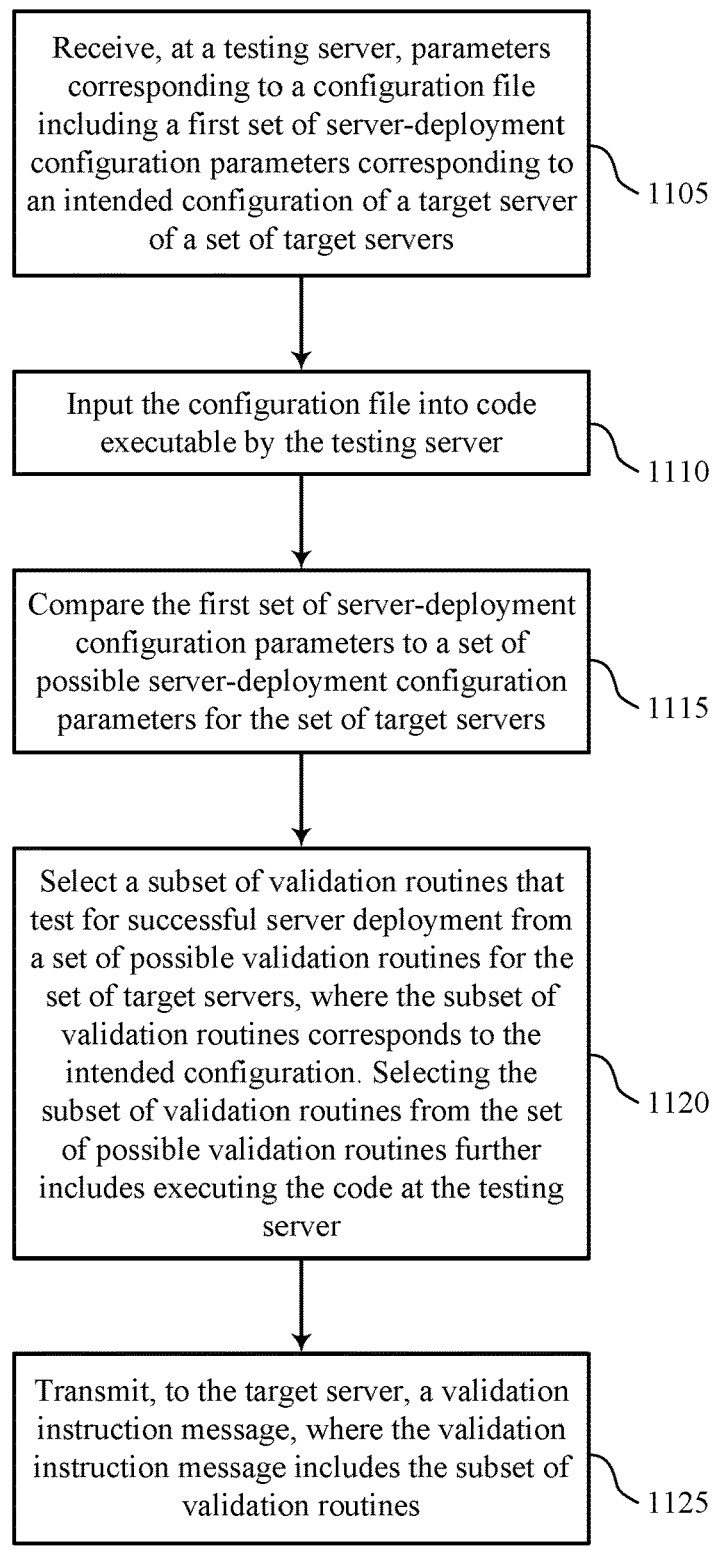

FIG. 11 shows a flowchart illustrating a method 1100 for flexible remote server validation in accordance with aspects of the present disclosure. The operations of method 1100 may be implemented by a testing server 205, 305, or 505 or its components as described herein, e.g., with reference to FIGS. 2, 3, and 5. For example, the operations of method 1100 may be performed by a validation module as described with reference to FIGS. 6 through 8. In some examples, a testing server 205, 305, or 505 may execute a set of codes to control the functional elements of the device to perform the functions described below. Additionally or alternatively, the testing server may perform aspects of the functions described below using special-purpose hardware.

At block 1105 the testing server may receive parameters corresponding to a configuration file, the configuration file comprising a first set of server-deployment configuration parameters corresponding to an intended configuration of a target server of a plurality of target servers. The operations of block 1105 may be performed according to the methods described herein. In certain examples, aspects of the operations of block 1105 may be performed by a configuration receiver as described with reference to FIGS. 6 through 8.

At block 1110 the testing server may input the configuration file into code executable by the testing server. The operations of block 1110 may be performed according to the methods described herein. In certain examples, aspects of the operations of block 1110 may be performed by a code component as described with reference to FIGS. 6 through 8.

At block 1115 the testing server may compare the first set of server-deployment configuration parameters to a set of possible server-deployment configuration parameters for the plurality of target servers. The operations of block 1115 may be performed according to the methods described herein. In certain examples, aspects of the operations of block 1115 may be performed by a configuration component as described with reference to FIGS. 6 through 8.

At block 1120 the testing server may select a subset of validation routines that test for successful server deployment from a set of possible validation routines for the plurality of target servers, wherein the subset of validation routines corresponds to the intended configuration. Selecting the subset of validation routines from the set of possible validation routines further comprises executing the code at the testing server. The operations of block 1120 may be performed according to the methods described herein. In certain examples, aspects of the operations of block 1120 may be performed by a validation selector as described with reference to FIGS. 6 through 8.

At block 1125 the testing server may transmit, to the target server, a validation instruction message, wherein the validation instruction message comprises the subset of validation routines. The operations of block 1125 may be performed according to the methods described herein. In certain examples, aspects of the operations of block 1125 may be performed by a validation instruction component as described with reference to FIGS. 6 through 8.

Figure 12:
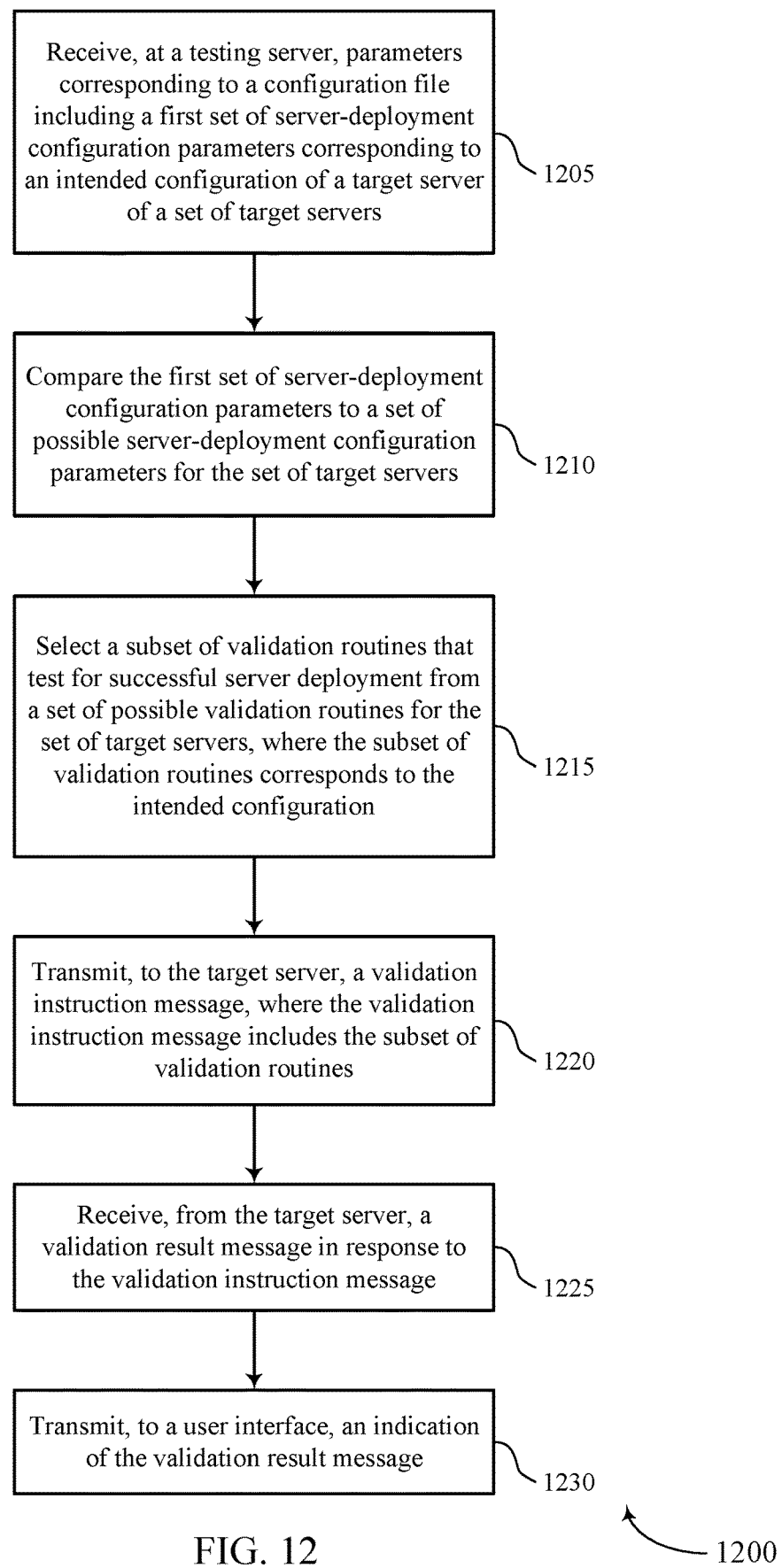

FIG. 12 shows a flowchart illustrating a method 1200 for flexible remote server validation in accordance with aspects of the present disclosure. The operations of method 1200 may be implemented by a testing server 205, 305, or 505 or its components as described herein, e.g., with reference to FIGS. 2, 3, and 5. For example, the operations of method 1200 may be performed by a validation module as described with reference to FIGS. 6 through 8. In some examples, a testing server 205, 305, or 505 may execute a set of codes to control the functional elements of the device to perform the functions described below. Additionally or alternatively, the testing server may perform aspects of the functions described below using special-purpose hardware.

At block 1205 the testing server may receive parameters corresponding to a configuration file, the configuration file comprising a first set of server-deployment configuration parameters corresponding to an intended configuration of a target server of a plurality of target servers. The operations of block 1205 may be performed according to the methods described herein. In certain examples, aspects of the operations of block 1205 may be performed by a configuration receiver as described with reference to FIGS. 6 through 8.

At block 1210 the testing server may compare the first set of server-deployment configuration parameters to a set of possible server-deployment configuration parameters for the plurality of target servers. The operations of block 1210 may be performed according to the methods described herein. In certain examples, aspects of the operations of block 1210 may be performed by a configuration component as described with reference to FIGS. 6 through 8.

At block 1215 the testing server may select a subset of validation routines that test for successful server deployment from a set of possible validation routines for the plurality of target servers, wherein the subset of validation routines corresponds to the intended configuration. The operations of block 1215 may be performed according to the methods described herein. In certain examples, aspects of the operations of block 1215 may be performed by a validation selector as described with reference to FIGS. 6 through 8.

At block 1220 the testing server may transmit, to the target server, a validation instruction message, wherein the validation instruction message comprises the subset of validation routines. The operations of block 1220 may be performed according to the methods described herein. In certain examples, aspects of the operations of block 1220 may be performed by a validation instruction component as described with reference to FIGS. 6 through 8.

At block 1225 the testing server may receive, from the target server, a validation result message in response to the validation instruction message. The operations of block 1225 may be performed according to the methods described herein. In certain examples, aspects of the operations of block 1225 may be performed by a validation result component as described with reference to FIGS. 6 through 8.

At block 1230 the testing server may transmit, to a user interface, an indication of the validation result message. The operations of block 1230 may be performed according to the methods described herein. In certain examples, aspects of the operations of block 1230 may be performed by a display component as described with reference to FIGS. 6 through 8.

A method of validating a plurality of target servers is described. The method may include receiving, at a testing server, parameters corresponding to a configuration file comprising a first set of server-deployment configuration parameters corresponding to an intended configuration of a target server of the plurality of target servers and comparing the first set of server-deployment configuration parameters to a set of possible server-deployment configuration parameters for the plurality of target servers. The method may further include selecting a subset of validation routines that test for successful server deployment from a set of possible validation routines for the plurality of target servers—wherein the subset of validation routines corresponds to the intended configuration—and transmitting, to the target server, a validation instruction message, wherein the validation instruction message comprises the subset of validation routines.

An apparatus for validating a plurality of target servers is described. The apparatus may include a processor, memory in electronic communication with the processor, and instructions stored in the memory. The instructions may be operable to cause the processor to receive, at a testing server, parameters corresponding to a configuration file comprising a first set of server-deployment configuration parameters corresponding to an intended configuration of a target server of the plurality of target servers, and compare the first set of server-deployment configuration parameters to a set of possible server-deployment configuration parameters for the plurality of target servers. The instructions may be further operable to cause the processor to select a subset of validation routines that test for successful server deployment from a set of possible validation routines for the plurality of target servers—wherein the subset of validation routines corresponds to the intended configuration—and transmit, to the target server, a validation instruction message, wherein the validation instruction message comprises the subset of validation routines.

A non-transitory computer-readable medium for validating a plurality of target servers is described. The non-transitory computer-readable medium may include instructions operable to cause a processor to receive, at a testing server, parameters corresponding to a configuration file comprising a first set of server-deployment configuration parameters corresponding to an intended configuration of a target server of the plurality of target servers, and compare the first set of server-deployment configuration parameters to a set of possible server-deployment configuration parameters for the plurality of target servers. The instructions may be further operable to cause the processor to select a subset of validation routines that test for successful server deployment from a set of possible validation routines for the plurality of target servers—wherein the subset of validation routines corresponds to the intended configuration—and transmit, to the target server, a validation instruction message, wherein the validation instruction message comprises the subset of validation routines.

Some examples of the method, apparatus, and non-transitory computer-readable medium described above may further include processes, features, means, or instructions for receiving, at the testing server, additional parameters corresponding to a second configuration file comprising a second set of server-deployment configuration parameters corresponding to a second intended configuration of a second target server of the plurality of target servers. Some examples of the method, apparatus, and non-transitory computer-readable medium described above may further include processes, features, means, or instructions for comparing the second set of server-deployment configuration parameters to the set of possible server-deployment configuration parameters for the plurality of target servers. Some examples of the method, apparatus, and non-transitory computer-readable medium described above may further include processes, features, means, or instructions for selecting a second subset of validation routines from the set of possible validation routines for the plurality of target servers, wherein the second subset of validation routines corresponds to the second intended configuration and may be different from the subset of validation routines. Some examples of the method, apparatus, and non-transitory computer-readable medium described above may further include processes, features, means, or instructions for transmitting, to the target server, a second validation instruction message, wherein the second validation instruction message comprises the second subset of validation routines. In some examples of the method, apparatus, and non-transitory computer-readable medium described above, the target server and the second target server may be configured for different applications.

Some examples of the method, apparatus, and non-transitory computer-readable medium described above may further include processes, features, means, or instructions for inputting the configuration file into code executable by the testing server, wherein selecting the subset of validation routines from the set of possible validation routines further comprises executing the code at the testing server.

Some examples of the method, apparatus, and non-transitory computer-readable medium described above may further include processes, features, means, or instructions for receiving, from the target server, a validation result message in response to the validation instruction message. Some examples of the method, apparatus, and non-transitory computer-readable medium described above may further include processes, features, means, or instructions for transmitting, to a user interface, an indication of the validation result message.

In some examples of the method, apparatus, and non-transitory computer-readable medium described above, the configuration file comprises a stack configuration file, an application type configuration file, a server type configuration file, a service configuration file, a JSON file, or a combination thereof. In some examples of the method, apparatus, and non-transitory computer-readable medium described above, the validation instruction message comprises a BDD test runner, a Pester test runner, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for validating a plurality of target servers in a cloud platform, comprising:
   initiating first and second validation processes of respective first and second target servers of the plurality of target servers based at least in part on respective first and second new or modified target server configurations of the respective first and second target servers;
   receiving, at a testing server and in response to initiating the first and second validation processes, respective first and second parameters of the respective first and second new or modified target server configurations, the respective first and second parameters corresponding to respective first and second configuration files, the respective first and second configuration files comprising respective first and second sets of server-deployment configuration parameters corresponding to respective first and second intended configurations of the respective first and second target servers;
   comparing the respective first and second sets of server-deployment configuration parameters to a set of possible server-deployment configuration parameters for the plurality of target servers;
   inputting the respective first and second configuration files into code executable by the testing server;
   selecting respective first and second subsets of validation routines that test for successful server deployment from a set of possible validation routines for the plurality of target servers, wherein the respective first and second subsets of validation routines correspond to the respective first and second intended configurations and are configured to compare the respective first and second intended configurations to the respective first and second new or modified target server configurations, and wherein the second subset of validation routines is different from the first subset of validation routines, and wherein selecting the respective first and second subsets of validation routines further comprises executing the code with the respective first and second configuration files at the testing server; and
   transmitting respective first and second validation instruction messages to the respective first and second target servers, wherein the respective first and second validation instruction messages comprise the respective first and second subsets of validation routines.

2. The method of claim 1, wherein the first target server and the second target server are configured for different applications.

3. The method of claim 1, further comprising:
   receiving, from the first target server, a first validation result message in response to the first validation instruction message.

4. The method of claim 3, further comprising:
   transmitting, to a user interface, an indication of the first validation result message.

5. The method of claim 1, wherein the first configuration file comprises a stack configuration file, an application type configuration file, a server type configuration file, a service configuration file, a JavaScript object notation (JSON) file, or a combination thereof.

6. The method of claim 1, wherein the first validation instruction message comprises a behavior-driven development (BDD) test runner, a Pester test runner, or a combination thereof.

7. An apparatus for validating a plurality of target servers in a cloud platform, comprising:
   a processor;
   memory in electronic communication with the processor; and
   instructions stored in the memory and operable, when executed by the processor, to cause the apparatus to:
   initiate first and second validation processes of respective first and second target servers of the plurality of target servers based at least in part on respective first and second new or modified target server configurations of the respective first and second target servers;
   receive, at a testing server and in response to initiating the first and second validation processes, respective first and second parameters of the respective first and second new or modified target server configurations, the respective first and second parameters corresponding to respective first and second configuration files, the respective first and second configuration files comprising respective first and second sets of server-deployment configuration parameters corresponding to respective first and second intended configurations of the respective first and second target servers;
   compare the respective first and second sets of server-deployment configuration parameters to a set of possible server-deployment configuration parameters for the plurality of target servers;
   input the respective first and second configuration files into code executable by the testing server;

select respective first and second subsets of validation routines that test for successful server deployment from a set of possible validation routines for the plurality of target servers, wherein the respective first and second subsets of validation routines correspond to the respective first and second intended configurations and are configured to compare the respective first and second intended configurations to the respective first and second new or modified target server configurations, and wherein the second subset of validation routines is different from the first subset of validation routines, and wherein selecting the respective first and second subsets of validation routines further comprises executing the code with the respective first and second configuration files at the testing server; and transmit respective first and second validation instruction messages to the respective first and second target servers, wherein the respective first and second validation instruction messages comprise the respective first and second subsets of validation routines.

8. The apparatus of claim 7, wherein the first target server and the second target server are configured for different applications.

9. The apparatus of claim 7, wherein the instructions are further executable by the processor to:

receive, from the first target server, a first validation result message in response to the first validation instruction message.

10. The apparatus of claim 9, wherein the instructions are further executable by the processor to:

transmit, to a user interface, an indication of the first validation result message.

11. A non-transitory computer-readable medium storing first code for validating a plurality of target servers in a cloud platform, the first code comprising instructions executable by a processor to:

initiate first and second validation processes of respective first and second target servers of the plurality of target servers based at least in part on respective first and second new or modified target server configurations of the respective first and second target servers;

receive, at a testing server and in response to initiating the first and second validation processes, respective first and second parameters of the respective first and second new or modified target server configurations, the respective first and second parameters corresponding to respective first and second configuration files, the respective first and second configuration files comprising respective first and second sets of server-deployment configuration parameters corresponding to respective first and second intended configurations of the respective first and second target servers;

compare the respective first and second sets of server-deployment configuration parameters to a set of possible server-deployment configuration parameters for the plurality of target servers;

input the respective first and second configuration files into second code executable by the testing server;

select respective first and second subsets of validation routines that test for successful server deployment from a set of possible validation routines for the plurality of target servers, wherein the respective first and second subsets of validation routines correspond to the respective first and second intended configurations and are configured to compare the respective first and second intended configurations to the respective first and second new or modified target server configurations, and wherein the second subset of validation routines is different from the first subset of validation routines, and wherein selecting the respective first and second subsets of validation routines further comprises executing the second code with the respective first and second configuration files at the testing server; and transmit respective first and second validation instruction messages to the respective first and second target servers, wherein the respective first and second validation instruction messages comprise the respective first and second subsets of validation routines.

12. The non-transitory computer-readable medium of claim 11, wherein the first target server and the second target server are configured for different applications.

13. The non-transitory computer-readable medium of claim 11, wherein the instructions are further executable by the processor to:

receive, from the first target server, a first validation result message in response to the first validation instruction message.

14. The non-transitory computer-readable medium of claim 13, wherein the instructions are further executable by the processor to:

transmit, to a user interface, an indication of the first validation result message.

15. The method of claim 1, wherein:

executing the code with the first configuration file at the testing server comprises executing a first set of lines of the code to perform the first subset of validation routines; and executing the code with the second configuration file at the testing server comprises executing a second set of lines of the code different from the first set of lines of the code to perform the second subset of validation routines.

16. The method of claim 4, further comprising:

receiving, from the second target server, a second validation result message in response to the second validation instruction message; and transmitting, to the user interface, an indication of the second validation result message.

* * * * *